(12) United States Patent
Kuo et al.

(10) Patent No.: US 7,477,814 B2
(45) Date of Patent: Jan. 13, 2009

(54) METHOD OF MAKING A LOUVER DEVICE FOR A LIGHT GUIDE SCREEN

(75) Inventors: Huei-Pei Kuo, Cupertino, CA (US); Laurence Hubby, Palo Alto, CA (US); Steven L Naberhuis, Fremont, CA (US); Xia Sheng, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 784 days.

(21) Appl. No.: 11/052,612

(22) Filed: Feb. 7, 2005

(65) Prior Publication Data
US 2006/0176556 A1    Aug. 10, 2006

(51) Int. Cl.
G02B 6/00 (2006.01)
G03B 21/56 (2006.01)

(52) U.S. Cl. ............................ 385/31; 385/50; 359/460
(58) Field of Classification Search ......... 385/115–120, 385/901; 359/454–459
See application file for complete search history.

(56) References Cited

U.S. PATENT DOCUMENTS

| | | | | |
|---|---|---|---|---|
| 3,043,910 A * | 7/1962 | Hicks, Jr. | ..................... | 348/804 |
| 3,402,000 A * | 9/1968 | Crawford | ..................... | 385/116 |
| 4,929,048 A | 5/1990 | Cuypers | | |
| 5,923,806 A * | 7/1999 | Sugawara | ..................... | 385/121 |
| 6,550,937 B2 | 4/2003 | Glass | | |
| 6,571,043 B1 | 5/2003 | Lowry et al. | | |
| 7,099,079 B2 * | 8/2006 | Hibi et al. | ..................... | 359/460 |
| 7,253,955 B2 * | 8/2007 | Watanabe et al. | ............ | 359/459 |
| 7,271,955 B2 * | 9/2007 | Osawa et al. | ................. | 359/453 |
| 2002/0191283 A1 * | 12/2002 | Browning | ..................... | 359/460 |

* cited by examiner

Primary Examiner—Michelle R Connelly Cushwa

(57) ABSTRACT

A method of making a louver device for a light guide screen. More specifically, in a specific embodiment, a transparent layer is provided. A plurality of similarly angled surfaces are established within the transparent layer. The angled surfaces are coated with a light-reflective material such that the coated surfaces define a plurality of light paths through the transparent layer.

35 Claims, 6 Drawing Sheets

US 7,477,814 B2

METHOD OF MAKING A LOUVER DEVICE FOR A LIGHT GUIDE SCREEN

RELATED APPLICATIONS

This application is related to commonly owned and recently allowed U.S. Patent Application identified by publication number 2005-0093814, filed on Oct. 31, 2003 as application Ser. No. 10/698,829 by inventors Huei Pei Kuo, Lawrence M. Hubby, Jr. and Steven L. Naberhuis and entitled "Light Guide Apparatus For Use In Rear Projection Display Environments," herein incorporated by reference.

FIELD

This invention relates generally to the field of display devices and, in particular, to a method of making a louver device for a light guide screen.

BACKGROUND

Socially and professionally, most people rely upon video displays in one form or another for at least a portion of their work and/or recreation. With a growing demand for large screens, such as high definition television (HDTV), cathode ray tubes (CRTs) have largely given way to displays composed of liquid crystal devices (LCDs) plasma display panels (PDPs), or front or rear projection systems.

A CRT operates by scanning electron beam(s) that excite phosphor materials on the back side of a transparent screen, wherein the intensity of each pixel is commonly tied to the intensity of the electron beam. With a PDP, each pixel is an individual light-emitting device capable of generating its own light. With an LCD, each pixel is a transient light-emitting device, individually adjusted to permit light to shine through the pixel.

As neither system utilizes a large tube, LCD and PDP screens may be quite thin and often are lighter than comparable CRT displays. However, the manufacturing process for LCDs, PDPs, and most other flat panel displays is much more complex and intensive with respect to both equipment and materials than that of CRTs, typically resulting in higher selling prices.

Projection systems offer alternatives PDP and LCD based systems. In many cases, projection display systems are less expensive than comparably sized PDP or LCD display systems. Rear projection display systems typically employ a wide angle projection lens (or multiple lenses), operating in connection with one or more reflective surfaces to direct light received from the projector through the lens(es) to the back of a screen. The lens and mirror arrangement typically enlarges the image as well.

To accommodate the projector, one or more lenses and reflectors, rear projection displays are typically 18 to 20 inches deep and not suitable for on-wall mounting. A typical rear projection system offering a 55-inch HDTV screen may weigh less than a comparable CRT, but at 200+ pounds it may be difficult and awkward to install and support.

Often, rear projection display devices exhibit average or below average picture quality in certain environments. For example, rear projection displays may be difficult to see when viewed from particular angles within a room setting or when light varies within the environment. Aside from a theatrical setting, light output and contrast is a constant issue in most settings and viewing environments.

Despite advancements in projectors and enhanced lens elements, the lens and reflector design remains generally unchanged and tends to be a limiting factor in both picture quality and overall display system thickness.

A developing variation of rear projection displays utilizes light guides, such as optical fibers, to route an image from an input location to an output location and to magnify the image. However, in certain configurations, light guide screens may lose a percentage of light and, thus, the brightness of the image, by permitting the light to venture off in directions other than substantially towards the viewing audience. This loss of light may in some instances amount to fifty percent (50%) of the light provided to the input ends of the light guides.

As such, there is a need for a louver device to reduce the loss of light likely with a light guide screen.

SUMMARY

This invention provides a method of making a louver device for a light guide screen.

In particular, and by way of example only, according to an embodiment of the present invention, this invention provides a method of making a louver device for a light guide screen including providing a transparent layer; establishing within the transparent layer a plurality of similarly angled surfaces; and coating the angled surfaces with a light-reflective material, the coated surfaces defining a plurality of light paths through the transparent layer.

DETAILED DESCRIPTION

Before proceeding with the detailed description, it is to be appreciated that the present teaching is by way of example, not by limitation. The concepts herein are not limited to use or application with a specific light guide screen. Thus, although the instrumentalities described herein are for the convenience of explanation, shown and described with respect to exemplary embodiments, it will be appreciated that the principles herein may be equally applied in other types light guide screen display systems.

Figure 1:
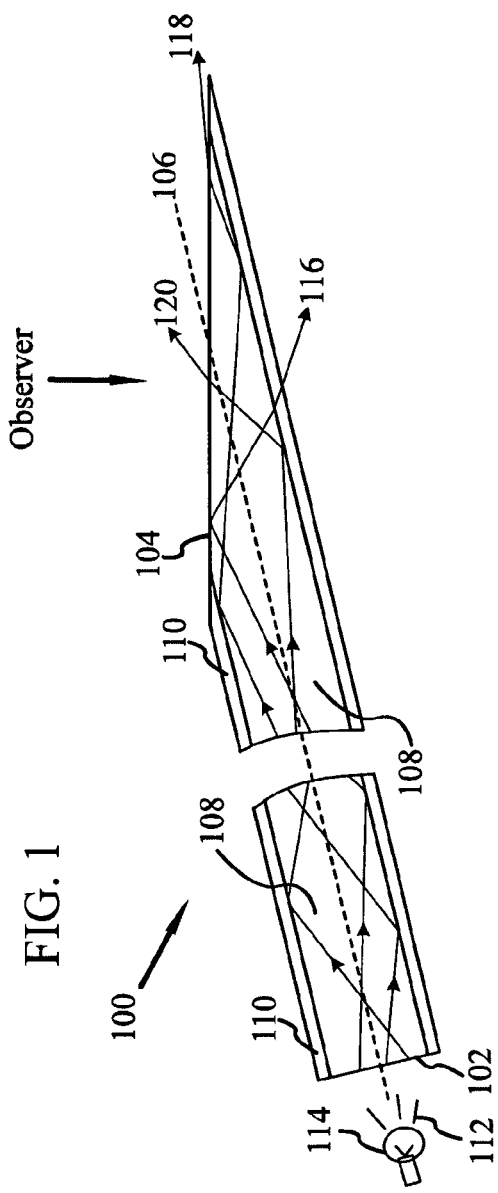
FIG. 1 shows a partial cross-section of a light guide screen light guide.
Figure 2:
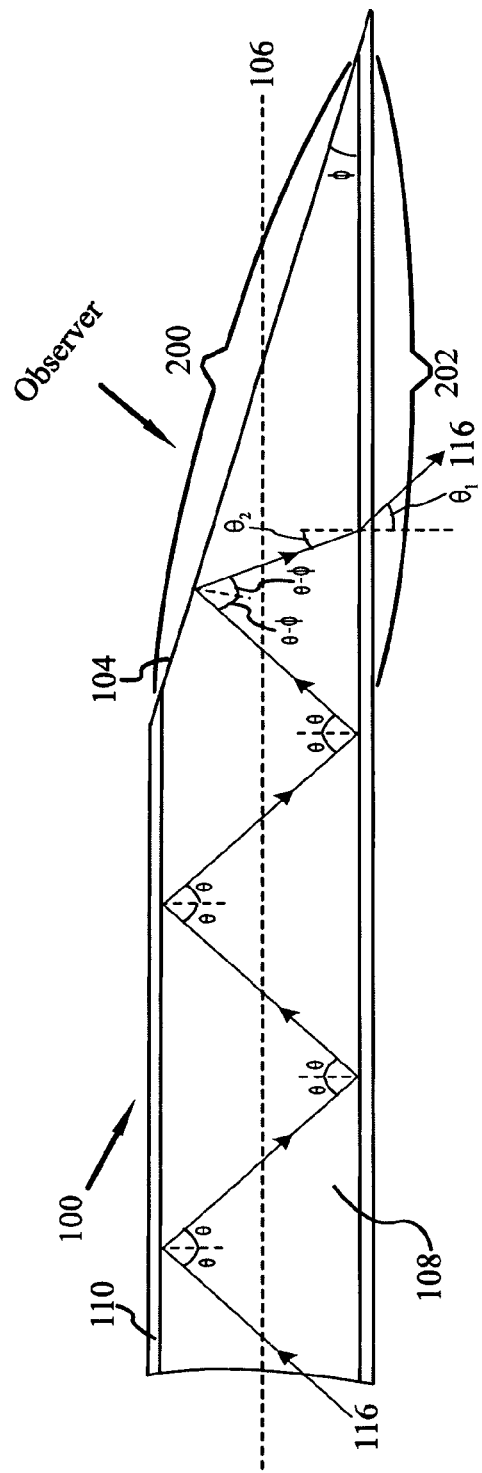
FIG. 2 shows an enlarged portion of the light guide in FIG. 1.

Referring now to the drawings, FIG. 1 and FIG. 2 conceptually illustrate an enlarged cross-section of a light guide as used in a light guide screen. FIGS. 3 through 8 conceptually illustrate a method of making a louver device 300, illustrated in completed form in FIG. 2, and again as louver device 902 in FIGS. 7, 8 and 9.

FIG. 1 conceptually illustrates a cross-section of a single light guide 100, having an input end 102 and an output end 104. As shown, input end 102 may be substantially perpendicular to longitudinal centerline 106. Output end 104 is at an acute angle relative to the longitudinal centerline 106. As such, the dimension of output end 104 in the plane of the paper is longer than the input end 102.

In at least one embodiment the light guides 100 comprising the light guide screen (not shown) are optical fibers, each having a longitudinal light guide core 108 and an external circumferential cladding 110. It is, of course, realized that light guide 100 may bend, coil or otherwise contour such that longitudinal centerline 106 is not always a straight line. Light guide 100 is shown with core 108 symmetric about longitudinal centerline 106 for ease of discussion and illustration.

In at least one embodiment, the core 108 is formed of a generally optically clear plastic or plastic-type material, including but not limited to a plastic such as acrylic, Plexiglas, polycarbonate material, and combinations thereof. In an alternative embodiment, the core 108 is formed of a generally optically clear glass.

In at least one embodiment, each light guide 100 is preferably substantially totally internally reflecting such that the light 112, illustrated as lines in FIG. 1, provided to input end 102 by light source 114 is substantially delivered to output end 104 through a series of internal reflections as shown by light rays 116, 118 and 120 with minimal loss. Cladding 110 is a material having a refraction index lower than that of the core 108. Total internal reflection, or TIR, is the reflection of all incident light off the boundary. TIR only occurs when a light ray is both in a medium with a higher index of refraction and approaches a medium with a lower index of refraction, and the angle of incidence for the light ray is greater than the "critical angle."

The critical angle is defined as the angle of incidence measured with respect to a line normal to the boundary between the two optical media for which light is refracted at an exit angle of 90 degrees—that is, the light propagates along the boundary—when the light impinges on the boundary from the side of the medium of higher index of refraction. For any angle of incidence greater than the critical angle, the light traveling through the medium with the higher index of refraction will undergo total internal refraction. The value of the critical angle depends upon the combination of materials present on each side of the boundary.

The use of light guides 100 with TIR qualities is generally advantageous permitting, for example, the length of the light guides 100 and location of the input end may be selected to minimize thickness of the light guide screen and/or improve service access to light source without substantially diminishing the quantity of light delivered by each light guide 100 to output end 104.

FIG. 2 is an enlarged portion of light guide 100 provided to further illustrate the possible propagation of a light ray 116. Light ray 116 travels in light guide 100 through successive TIR, as shown in FIG. 2. The angle of incidence and reflection remains unchanged at angle $\Theta$. When the light ray 116 enters the tapered section of output end 104, the incident angle decreases by $\Phi$ at each successive TIR. After x bounces into the tapered section, the incident angle becomes $\Theta_2 = \Theta - x\Phi$. When $\Theta_2$ becomes less than the critical angle, light ray 116 exits the light guide 100 at an angle $\Theta_1$, where $\Theta_1$ is defined by the following equations, wherein $n_2$ is the index of refraction of the core and $n_1$ is the index of refraction for the clad $$n_2 > n_1$$

$$\Theta_2 < \Theta_1$$

$$n_2 \sin \Theta_2 = n_1 \sin \Theta_1$$

Typically, $\Theta_1 > 60°$ and light tray 116 can exit either from front surface 200 of output end 104 or the back surface 202 of output end 104. When viewed from a direction perpendicular to output end 104, the light ray 116 exiting back surface 202 cannot reach the observer and is wasted.

As an observer is generally viewing the light guide screen from a position transverse to the output end, light rays 116 and 118 clearly do not reach the observer. Of the three light rays illustrated, only light ray 120 is traveling most generally towards the viewing observer. However, light ray 120 is continuing substantially in the direction of longitudinal centerline 106.

Figure 3:
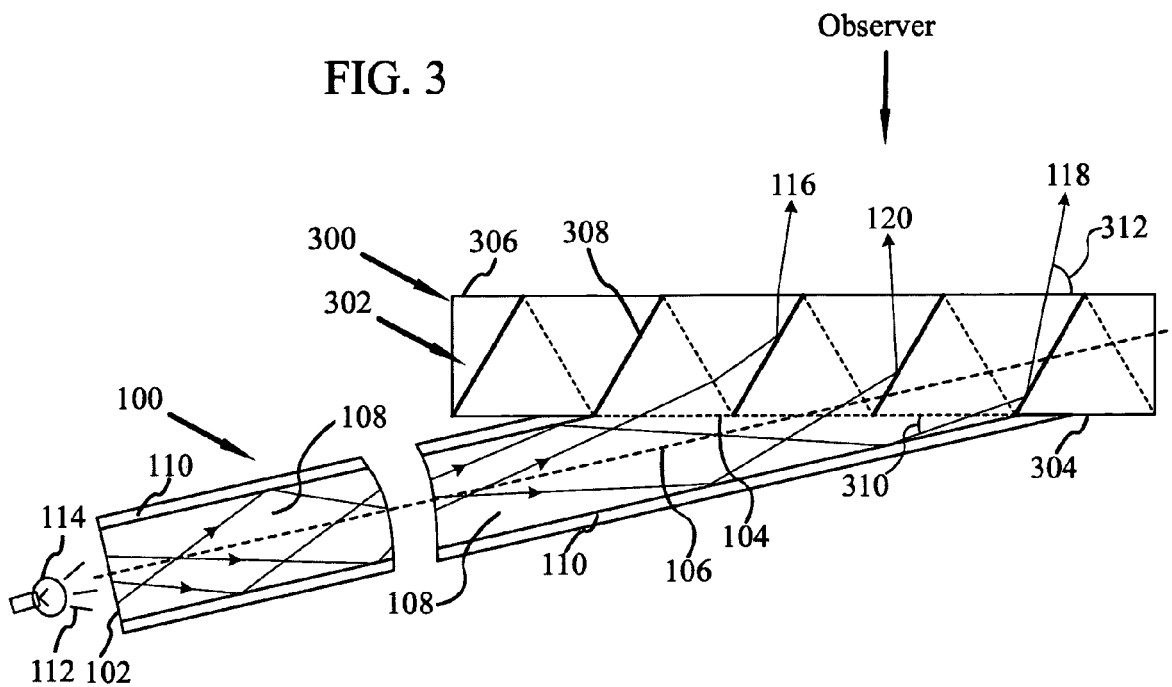
FIG. 3 shows a partial cross-section of a light guide component of a light guide screen light guide with attached louver.

FIG. 3 illustrates an appropriate louver device 300 disposed upon output end 104. In at least one embodiment, louver device 300 consists of a sheet of transparent material 302, having an inner surface 304 and, parallel thereto, an outer surface 306. A plurality of reflective louver members 308 (illustrated as thick black line) are disposed at least partially within transparent material 302.

Louver members 308 are aligned to receive light 112 entering the inner surface 304 from output end 104 of light guide 100 at a low angle 310 relative to inner surface 304, and to direct light 112 out the outer surface 306 at a high angle 312 relative to the outer surface 306. As such, in FIG. 2 all three illustrated light rays 116, 118, 120 are traveling generally towards the viewing observer. Light ray 116, which exits the backside of the light guide 100 in FIG. 1 now exits on the side towards the observer in FIG. 3.

Having thus introduced the advantageous nature of a louver device to enhance the quantity of light delivered to a viewing observer, FIGS. 4 through 11 now present at least one embodiment of making louver device 300. It will be appreciated that the described process need not be performed in the order in which it is herein described, but that this description is merely exemplary of one preferred embodiment of fabricating a louver device for a light guide screen. In addition, it is appreciated that the drawings are not necessarily drawn to scale and may be expanded in certain aspects for ease of discussion.

Figure 4:
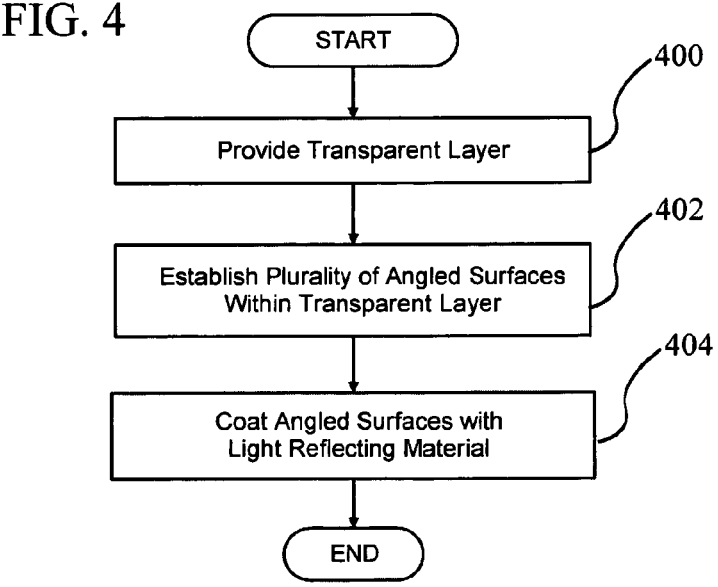
FIG. 4 is a high level flow diagram of a method of fabricating the louver shown in FIG. 3, according to an embodiment.

FIG. 4 provides a high-level overview of the fabrication process. Namely, providing a transparent layer, block 400. A plurality of angled surfaces are then established within the transparent layer, block 402. The angled surfaces are then coated with a light-reflective material, block 404.

Figure 5:
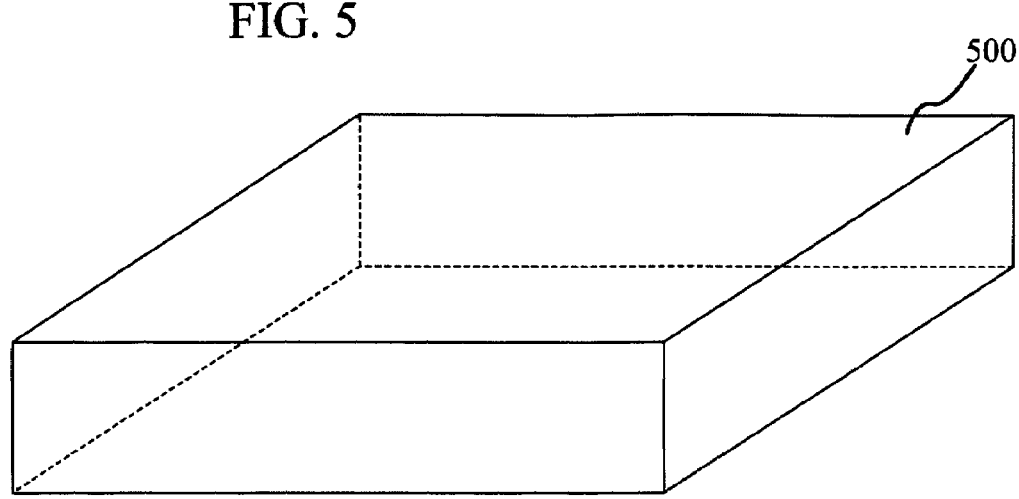
FIG. 5 illustrates a transparent layer provided in the fabrication of the louver shown in FIG. 3, according to an embodiment.

As shown in FIG. 5, in at least one embodiment, the fabrication process may be commenced by providing a transparent layer 500. Generally, the transparent layer 500 will be provided with a selected index of refraction. In at least one embodiment, the index of refraction for transparent layer 500 will be substantially the same as the index of refraction of the light guide cores 108 establishing the light guide screen.

As used herein, the term "transparent" is generally defined to include the definitions of "capable of transmitting light so that objects or images can be seen as if there were no intervening material," and "easily seen through." In at least one embodiment the layers and materials described as transparent may be more aptly described as translucent, in that they may be colored, and/or diffusing.

In at least one embodiment, transparent layer 500 may be glass, plastic, polymer or combinations thereof. Further, transparent layer 500 may or may not be polarized, as the presence or absence of polarization may benefit particular embodiments.

Figure 6:
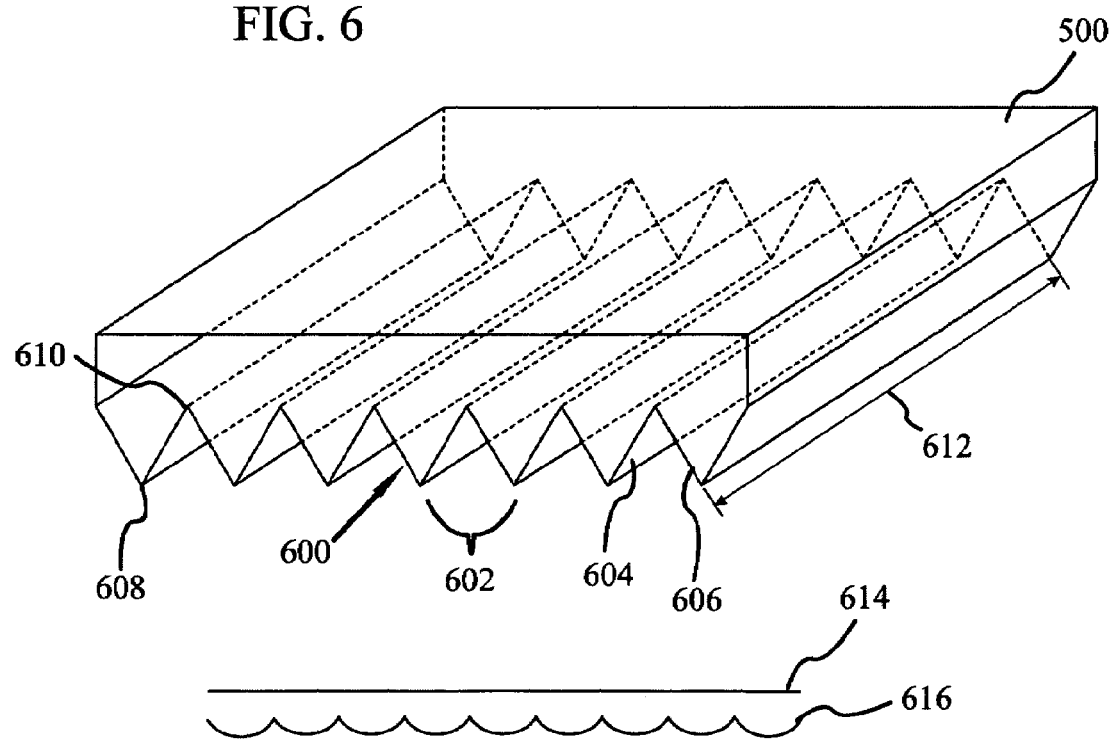
FIG. 6 illustrates grooves established in the transparent layer shown in FIG. 5, according to an embodiment.

A plurality of similarly angled surfaces 600 are then established with transparent layer 500, as shown in FIG. 6. More specifically, in at least one embodiment, transparent layer 500 is grooved to provide a plurality of grooves 602, each having at least a first surface 604 intersecting a second surface 606. Although illustrated as continuous across transparent layer 500 for ease of illustration, it is understood and appreciated that in at least one embodiment, groves 602 may be segmented.

Grooves 602 may be established by etching, imprinting, embossing, or such other process as deemed appropriate by the fabrication technician. In at least one embodiment, grooves 602 are established by imprinting.

Grooves 602 also have a top 608 and a bottom 610. In an embodiment as shown, the grooves 602 may be described as triangular shaped in cross-section. In at least one embodiment, transparent layer 500 is substantially transparent; thus, the features of grooves 602 are shown with dotted lines to indicate the location of the features although they may be substantially invisible.

In at least one embodiment, the plurality of grooves 602 are substantially identical and spaced at regular intervals. The light guide screen comprises a plurality of pixels. With respect to FIG. 3, the output end of each light guide 100 may define the length, and/or height of each pixel. So as to effectively redirect light from output end 104 to an observer, the louver members 308 are aligned to transversely cross output end 104. Output ends 104 repeat with periodicity in providing the viewing surface of a light guide screen. The louver members 308 also repeat with periodicity.

When two periodic structures are close to the same periodicity or simple fractions thereof and disposed proximate to one another, visible fringe patterns may occur. In at least one embodiment, the potential for such fringe patterns may be significantly reduced by spacing the angled surfaces 600 at intervals about one-third the size of each pixel which interval is optimal for pixel resolution with reduction in fringing patterns. There is little change if the intervals are smaller. However, as intervals approach ½ or more of the pixel size, fringing patterns become problematic and resolution can be degraded.

In at least one embodiment, the angled surfaces 600 (such as the plurality of first surfaces 604) are flat such that, when viewed as a cross-section along their length 612, each would appear as straight line 614. In an alternative embodiment, angled surfaces 600 (such as the plurality of first surfaces 604) are cylindrical. In yet another alternative embodiment, the angled surfaces 600 (such as the plurality of first surfaces 604) are scalloped such that when viewed as a cross-section along their length 612, each would appear as scalloped line 616. Further, in at least one embodiment, the grooves 602 are substantially parallel. In one implementation, the angled surfaces 600 are roughened randomly or textured.

Figure 7:
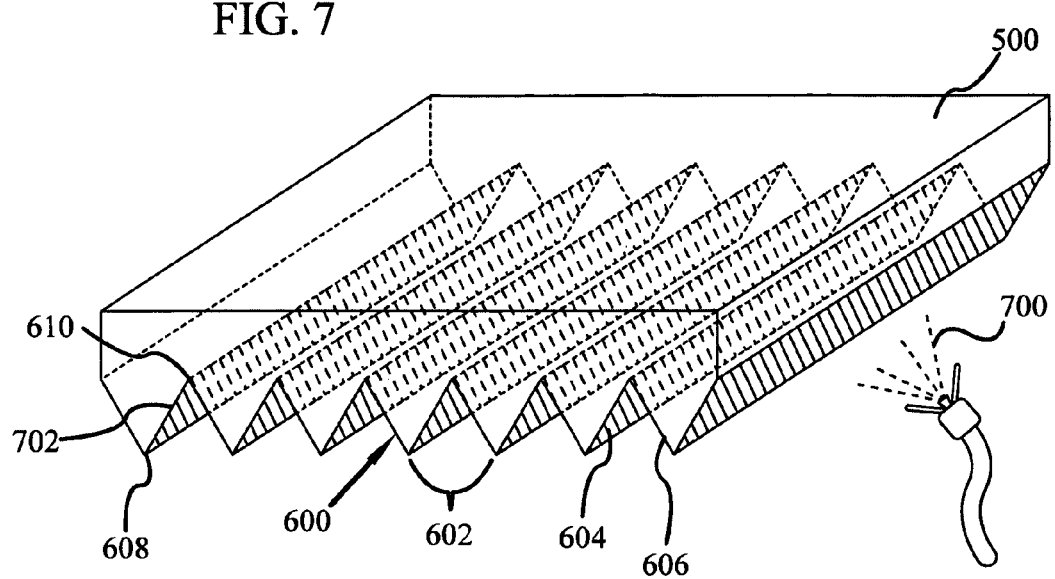
FIG. 7 illustrates the application of a reflective material to the first surfaces of the grooves shown in FIG. 5, according to an embodiment.

The angled surfaces 600 are coated with a light-reflective material 700, as shown in FIG. 7. More specifically, in at least one embodiment the first surfaces 604 are coated with a light-reflective material 700 to establish reflective coated surfaces 702. In at least one embodiment, light-reflective material 700 is anisotropically applied such that first surfaces 604 receive a coating sufficient to form a reflective surface, and second surfaces 606 remain uncoated. In an alternative embodiment (not shown), the light-reflective material 700 may be deposited to substantially coat all surfaces. By performing an anisotropic etch, light-reflective material 700 may be removed from second surfaces 606.

In at least one embodiment, the light-reflective material 700 comprises metal such as, for example, silver or aluminum. The layer of light-reflective material 700 applied is sufficiently thick so as to not be light transmissive. In an embodiment utilizing silver, the coating may be about one-thousand angstroms thick. In an embodiment where the cross-section of each coated first surface 604 is a straight line 614 (as shown in FIG. 6), the coated first surfaces 604 act as plane mirror surface.

In an alternative embodiment where the cross-section of each coated first surface 604 is a scalloped line 616 (as shown in FIG. 6), the coated first surface 604 provides a linear array of cylindrical or ellipsoidal mirror segments. Such cylindrical or ellipsoidal mirror segments may be preferred in embodiments providing an enhanced viewing zone. In yet another alternative embodiment, first surface 604 and/or the coating applied to first surface 604 may be textured. Such texturing may provide a plurality of reflective points and therefore further enhance the viewing zone.

In most environments, an observing party will most likely be viewing from a location transverse to the output end 104 shown in FIGS. 1 and 2. When reflected from a plane mirror, the delivered light will likely emerge from the outer surface 306 with an annular field of view normalized to the outer surface 306, but substantially the same as angle of acceptance of the light guide 100, as shown in FIG. 3. By providing cylindrical or ellipsoidal mirror elements with appropriate focusing power in the horizontal and vertical directions, the spread of light from the display may be expanded to provide an enhanced viewing zone.

Figure 8:
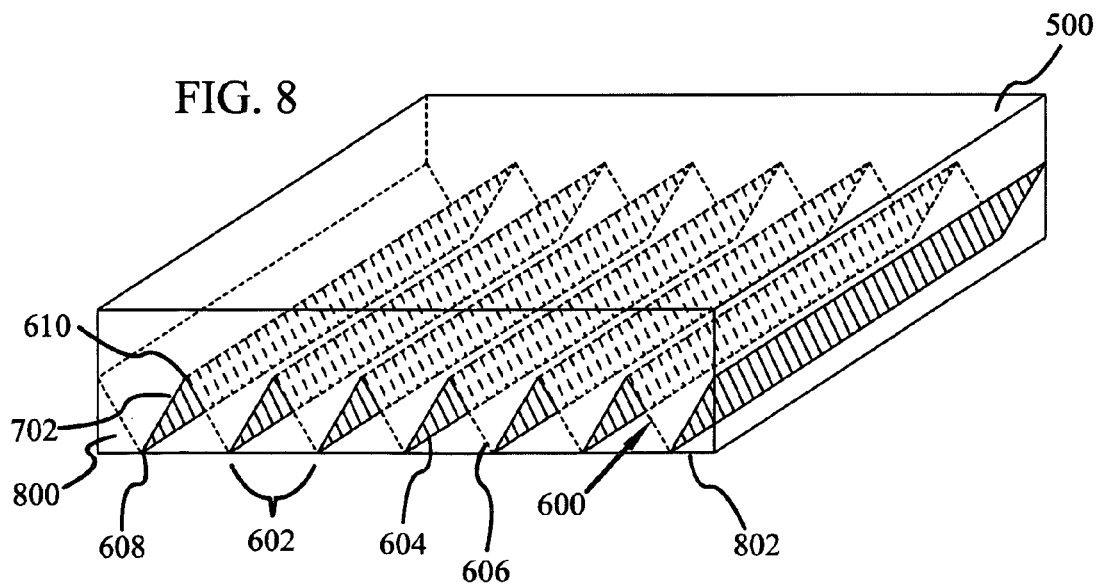
FIG. 8 illustrates the grooves of FIG. 5 as filled in by a transparent material, and planarized, according to an embodiment.

As described above, an angle of incidence occurs at boundaries where light traveling in one medium with one index of refraction encounters another medium with a different index of refraction. As shown in FIG. 8, in at least one embodiment, a transparent material 800 is deposited upon the plurality of grooves 602. More specifically, the grooves 602 are filled with a transparent material 800. Transparent material 800 may be applied by as a liquid polymer and then cured.

In at least one embodiment, the transparent material 800 has an index of refraction about the same as transparent layer 500. Moreover, transparent layer 500 and transparent material 800 may comprise the same plastic, polymer or glue. Further, the transparent material 800 has an index of refraction about the same as the index of refraction of the light guide cores 108 establishing the light guide screen.

In at least one embodiment, the transparent material 800 serves to both fill the grooves and to bond the louver device to the light guide screen. As transparent material 800 has an index of refraction that is substantially identical to that of the light guide cores (i.e., cores 108, FIGS. 1-3) and transparent layer 500, there is no apparent boundary to disrupt or alter the path of light as it is travels from the light guides (i.e., light guides 100, FIGS. 1-3) to the reflective coated surfaces 702. In other words, transparent material 800 joins the louver device to the light guide screen with a substantially boundaryless union.

In at least one alternative embodiment, the transparent material 800 is planarized to provide a uniform planar light-receiving surface 802. As shown, light-receiving surface 802 is substantially defined by the top 608 of each groove 602.

This planar light-receiving surface 802 is substantially the same as inner surface 304, shown in FIG. 2. As the planar light-receiving surface 802 has substantially the same index of refraction as the light guide cores 108 establishing the light guide screen, when planar light-receiving surface 802 is joined to the light guide screen, there is substantially no boundary to disrupt or alter the path of light as it travels from the light guides 100 to the reflective surface 702.

Moreover, the joining of the planar light-receiving surface 802 to the light guide screen is accomplished with a substantially boundaryless union. It is understood and appreciated that when such joining is accomplished with a joining agent (i.e. glue) having substantially the same index of refraction as the light guide cores 108 and transparent material 800.

Figure 9:
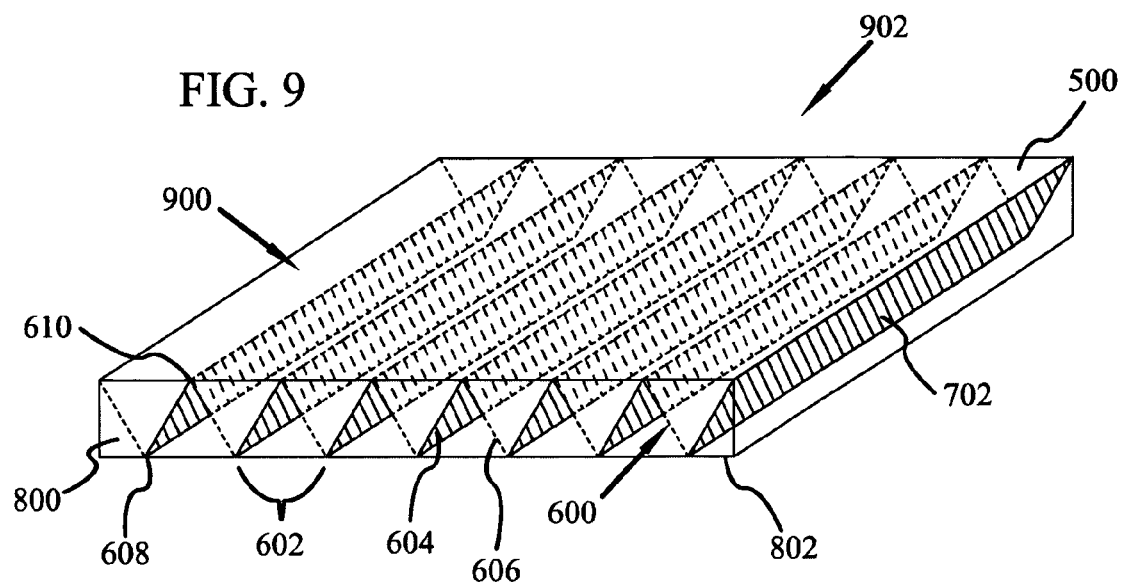
FIG. 9 illustrates the transparent layer as planarized to the bottom of the grooves of FIG. 5, providing a louver device according to an embodiment.

As shown in FIG. 9, transparent layer 500 may also be planarized to provide a uniform planar light output surface 900. In at least one embodiment, transparent layer 500 is planarized to the bottom 610 of grooves 602, thus providing fabricated louver device 902, substantially identical to lover device 300 shown in FIG. 2. As transparent layer 500 and transparent material 800 have substantially the same index of refraction, the boundary along second surfaces 606 may be substantially immaterial and is therefore shown as a dotted line.

Figure 10:
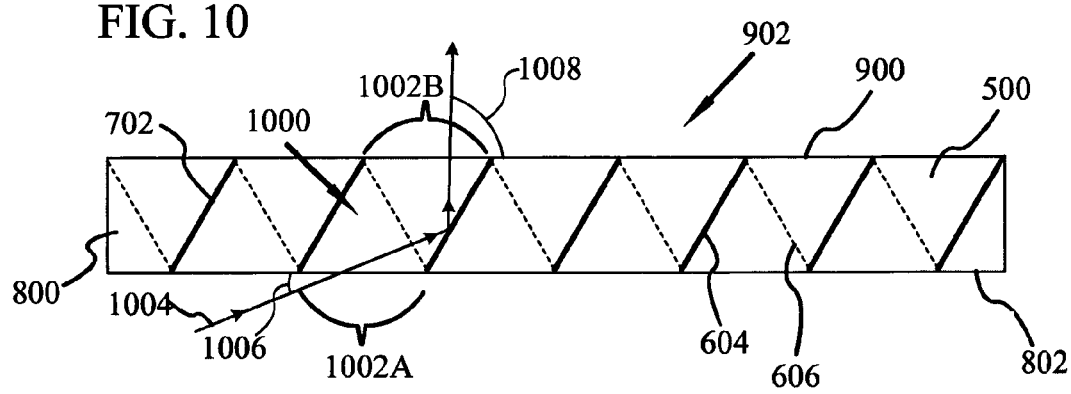
FIG. 10 is a plane view of the fabricated louver device of FIG. 9.

FIG. 10 illustrates a side view of louver device 902. As shown, reflective surfaces 702 define a plurality of light paths 1000 through transparent layer 500. Specifically, light path 1000 has an input end 1002A and an output end 1002B. Light 1004 entering input end 1002A at a low angle 1006 relative to light-receiving surface 802 is reflected off reflective surfaces 702 (i.e. coated first surface 604) so as to exit light output surface 900 at a high angle 1008 relative to light output surface 900. Moreover, light path 1000 is a single-bounce path, i.e. light rays are reflected only once by reflecting surfaces 702.

Figure 11:
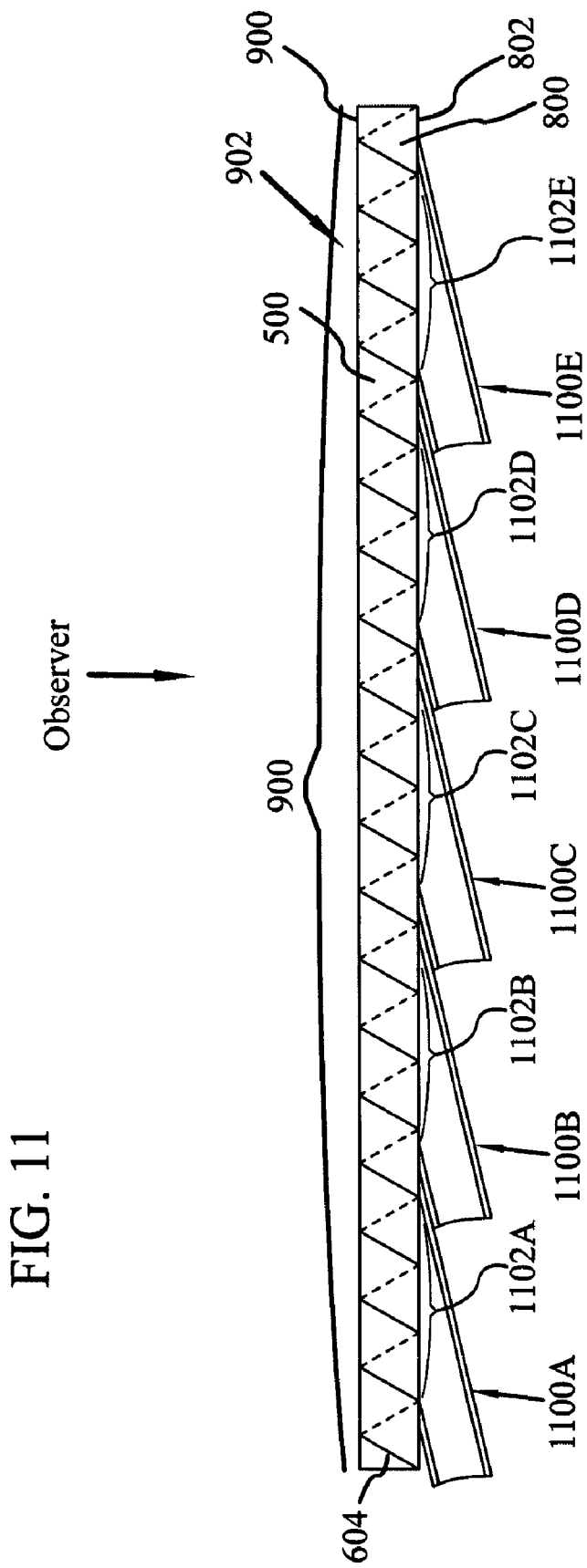
FIG. 11 is a partial cross-sectional view of a fabricated louver device attached to a light guide screen.

FIG. 11 illustrates a partial cut-away view of the light output surface 900 of a light guide screen composed of a plurality of light guides 1100A~1100E, each substantially identical to light guide 100 described above with respect to FIGS. 1 and 2. In at least one embodiment, fabricated louver device 902 is attached to output ends 1102A~1102E of light guides 1100A~1100E by glue. In addition, the glue may be selected to have an index of refraction substantially matching that of the light guide 1100 core material and that of transparent material 800.

As shown in FIG. 11, light output surface 900 is substantially smooth. No portion of coated first surfaces 604 are shown to extend above light output surface 900. In other words, light output surface 900 is substantially smooth, a property that may have advantages in avoiding the collection of dust and debris that would likely diffuse and/or diminish the quality of light provided to the viewing observer.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A method of making a louver device for a light guide screen, comprising:
   providing a transparent layer;
   establishing within the transparent layer a plurality of similarly angled surfaces;
   coating the angled surfaces with a light-reflective material, the coated surfaces defining a plurality of light paths through the transparent layer;
   wherein the light guide screen comprises a plurality of pixels and wherein the coated surfaces of the louver device are established at a spacing interval at a maximum of one half the size of each pixel.

2. The method of making a louver device of claim 1, wherein the transparent layer is translucent.

3. The method of making a louver device of claim 1, wherein each light path comprises a single-bounce path.

4. The method of making a louver device of claim 1, wherein the coated surfaces are segmented.

5. The method of making a louver device of claim 1, wherein the coated surfaces are scalloped.

6. The method of making a louver device of claim 5, wherein the scalloped surfaces provide ellipsoidal mirror segments.

7. The method of making a louver device of claim 1, wherein the coated surfaces are textured.

8. The method of making a louver device of claim 1, wherein the louver device is joined to the light guide screen with a substantially boundaryless union.

9. The method of making a louver device of claim 1, further including depositing a transparent material over the coated surfaces and planarizing the material to provide a uniform planar light-receiving surface upon the transparent layer.

10. The method of making a louver device of claim 9, wherein the transparent layer has a selected index of refraction and the transparent material has an index of refraction about the same as the transparent layer.

11. A method of making a louver device for a light guide screen, comprising:
    providing a transparent layer;
    grooving the transparent layer to provide a plurality of grooves, each groove having at least a first surface intersecting a second surface, each groove having a top and a bottom; and
    coating the plurality of first surfaces with a light-reflective material;
    wherein the light guide screen comprises a plurality of pixels and wherein the grooves are established at a spacing interval at a maximum of one half the size of each pixel.

12. The method of making a louver device of claim 11, further including depositing a transparent material upon the plurality of grooves.

13. The method of making a louver device of claim 12, wherein the louver device is bonded to the transparent material deposited upon the grooves bonds the louver device to the light guide screen with a substantially boundaryless union.

14. The method of making a louver device of claim 12, wherein the light guide screen includes a plurality of light guides, each having a light-delivering core with an index of refraction, the transparent layer and transparent material selected to have an index of refraction about the same as the light guide core index of refraction.

15. The method of making a louver device of claim 12, wherein the index of refraction for the transparent layer is about the same as the index of refraction for the deposited transparent material.

16. The method of making a louver device of claim 12, wherein the transparent layer and the transparent material are translucent.

17. The method of making a louver device of claim 12, further including planarizing the transparent material to the top of the grooves.

18. The method of making a louver device of claim 11, wherein the louver device is joined to the light guide screen with a substantially boundaryless union.

19. The method of making a louver device of claim 11, further including planarizing the transparent layer to the bottom of the grooves.

20. The method of making a louver device of claim 11, wherein the grooves are triangular shaped.

21. The method of making a louver device of claim 11, wherein the grooves are segmented.

22. The method of making a louver device of claim 11, wherein the grooves are parallel.

23. The method of making a louver device of claim 11, wherein the light-reflective material comprises metal.

24. The method of making a louver device of claim 11, wherein the second surface of each groove remains uncoated by light-reflective material.

25. The method of making a louver device of claim 11, wherein each first surface of each groove is scalloped.

26. The method of making a louver device of claim 25, wherein the scalloped first surfaces provide ellipsoidal mirror segments.

27. The method of making a louver device of claim 11, wherein each first surface of each groove is textured.

28. A louver device for a light guide screen, formed by:
   forming a plurality of grooves in a transparent layer, each groove having at least a first surface intersecting a second surface, the transparent layer having a selected index of refraction;
   coating the plurality of first surfaces with a light-reflecting material; and
   filling the plurality of grooves with transparent material having an index of refraction substantially identical to the index of refraction of the transparent layer;
   wherein the light guide screen comprises a plurality of pixels and wherein the grooves are established at a spacing interval at a maximum one half of the size of each pixel.

29. The louver device of claim 28, wherein the transparent material filling the grooves bonds the louver device to the light guide screen in a substantially boundaryless union.

30. The louver device of claim 28, wherein the light guide screen includes a plurality of light guides, each having a light-delivering core with an index of refraction, the transparent layer and transparent material selected to have an index of refraction about the same as the light guide core index of refraction.

31. The louver device of claim 28, wherein the coated first surfaces define a plurality of light paths through the transparent layer, each light path comprising a single-bounce path.

32. The louver device of claim 28, wherein the first surfaces are scalloped.

33. The louver device of claim 28, wherein the scalloped first surfaces provide ellipsoidal mirror segments.

34. The louver device of claim 32, wherein the transparent layer and the transparent material are translucent.

35. The louver device of claim 28, wherein the coated first surfaces are textured.

* * * * *

UNITED STATES PATENT AND TRADEMARK OFFICE
CERTIFICATE OF CORRECTION

PATENT NO. : 7,477,814 B2  Page 1 of 1
APPLICATION NO. : 11/052612
DATED : January 13, 2009
INVENTOR(S) : Huei-Pei Kuo et al.

It is certified that error appears in the above-identified patent and that said Letters Patent is hereby corrected as shown below:

In column 10, line 24, in Claim 33, delete "claim 28" and insert -- claim 32 --, therefor.

In column 10, line 26, in Claim 34, delete "claim 32" and insert -- claim 28 --, therefor.

Signed and Sealed this

Twenty-sixth Day of May, 2009

JOHN DOLL
*Acting Director of the United States Patent and Trademark Office*